US009223361B2

(12) United States Patent
Cary

(10) Patent No.: US 9,223,361 B2
(45) Date of Patent: Dec. 29, 2015

(54) CONFIGURABLE COMPUTER HOUSING

(71) Applicant: ORIGIN PC, Miami, FL (US)

(72) Inventor: Richard Cary, Miami, FL (US)

(73) Assignee: Origin PC, Miami, FL (US)

(*) Notice: Subject to any disclaimer, the term of this patent is extended or adjusted under 35 U.S.C. 154(b) by 246 days.

(21) Appl. No.: 13/752,156

(22) Filed: Jan. 28, 2013

(65) Prior Publication Data
US 2014/0211410 A1 Jul. 31, 2014

(51) Int. Cl.
G06F 1/16 (2006.01)
H05K 5/00 (2006.01)
H05K 7/00 (2006.01)
G06F 1/20 (2006.01)
G06F 1/18 (2006.01)

(52) U.S. Cl.
CPC *G06F 1/20* (2013.01); *G06F 1/184* (2013.01); *G06F 2200/201* (2013.01)

(58) Field of Classification Search
CPC ............. H05K 7/20536–7/20836; H05K 7/14; H05K 7/1422; H05K 7/1427; H05K 7/1485; H05K 7/1487; H05K 7/1488; H05K 7/1492; H05K 7/20136; G06F 1/20–1/206; G06F 2200/201
USPC ............. 361/679.01–679.02, 679.46–679.54, 361/688–727, 679.6; 312/223.1–223.3; 211/26
See application file for complete search history.

(56) References Cited

U.S. PATENT DOCUMENTS

| 5,680,536 | A | * | 10/1997 | Tyuluman | 714/1 |
| 6,094,351 | A | * | 7/2000 | Kikinis | 361/752 |
| 6,385,036 | B1 | * | 5/2002 | Chien | 361/679.58 |
| 6,937,476 | B1 | * | 8/2005 | Chen et al. | 361/756 |
| 2004/0022018 | A1 | * | 2/2004 | Chen | 361/683 |
| 2004/0233643 | A1 | * | 11/2004 | Bolich et al. | 361/727 |
| 2009/0231790 | A1 | * | 9/2009 | Chi | 361/679.6 |

OTHER PUBLICATIONS

Bit-tech website: http://www.bit-tech.net/hardware/cases/2011/04/08/silverstone-temjin-tj11-review/1 Date posted: Apr. 8, 2011 Date accessed: Dec. 24, 2014.*
Mountain Mods website: http://www.mountainmods.com/monticle-24-cyo-custom-computer-case-p-500.html Internet Archive posting date: Oct. 25, 2012 Date accessed: Dec. 23, 2014.*
Bit-tech website: http://www.bit-tech.net/hardware/cases/2011/04/08/silverstone-temjin-tj11-review/1 Date posted: Apr. 8, 2011 Date accessed: May 18, 2015.*

* cited by examiner

Primary Examiner — Anthony Haughton
Assistant Examiner — Yahya Ahmad
(74) Attorney, Agent, or Firm — Mayback & Hoffman, P.A.; Gregory L. Mayback

(57) ABSTRACT

A configurable computer housing includes a frame and a removable motherboard unit. There are a plurality of openings on the frame that are configured to receive the removable motherboard unit.

19 Claims, 15 Drawing Sheets

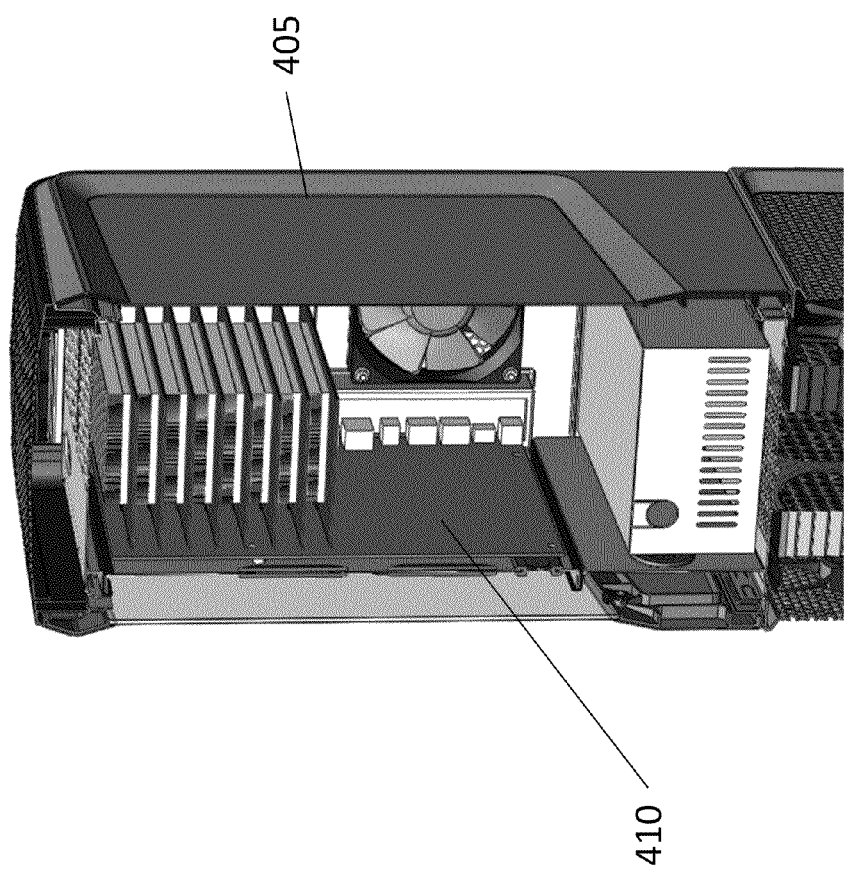

CONFIGURABLE COMPUTER HOUSING

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The present invention lies in the field of computer housings. The present disclosure relates to a configurable computer housing.

BACKGROUND OF THE INVENTION

Present day motherboards are installed in computer housings in a fixed manner. Users installing motherboards usually follow a template to attach the motherboard to the computer housing. This is usually done by lining up holes in the motherboard with corresponding screw holes within the computer housing. Motherboards are usually horizontally mounted within a computer housing. The motherboard is inserted onto a fixed tray inside the computer housing and screwed to the fixed tray using a plurality of screws.

The motherboard is fixedly attached to a tray that is, itself, fixed within the computer housing. Customers having configuration needs or desires that differ from standard computer housings require custom solutions.

Thus, a need exists to overcome the problems with the prior art systems, designs, and processes as discussed above.

SUMMARY OF THE INVENTION

The invention provides a computer housing that overcome(s) the hereinafore-mentioned disadvantages of the heretofore-known devices and methods of this general type and that provide such features with a configurable computer housing.

With the foregoing and other objects in view, there is provided, in accordance with the invention, a configurable computer housing. In one embodiment, the configurable computer housing has a frame and a removable motherboard unit. There are a plurality of openings on the frame that are configured to receive the removable motherboard unit.

In accordance with another feature of the invention, the removable motherboard unit comprises a tray and a motherboard attached to the tray.

In accordance with a further feature of the invention, the motherboard includes at least one video card.

In accordance with an added feature of the invention, the removable motherboard unit is configured to be inserted into a top opening of the plurality of openings on the frame in a first position.

In accordance with an additional feature of the invention, the removable motherboard unit is configured to be inserted into the top opening of the plurality of openings on the frame in a second position.

In accordance with yet another feature of the invention, the removable motherboard unit is rotated in order to be placed in the second position.

In accordance with yet a further feature of the invention, the removable motherboard unit is configured to be inserted into a rear opening of the plurality of openings on the frame in a first position.

In accordance with yet an added feature of the invention, the removable motherboard unit is configured to be inserted into the rear opening of the plurality of openings on the frame in a second position.

In accordance with yet an additional feature of the invention, the removable motherboard unit is rotated in order to be placed in the second position.

In accordance with again another feature of the invention, at least one side opening is configured to receive a transparent side panel.

In accordance with again a further feature of the invention, when the removable motherboard unit is configured to be inserted into a top opening, rear and side panels are attached to the frame.

In accordance with again an added feature of the invention, the rear and side panels are at least one of transparent, partially transparent, opaque, partially opaque, perforated mesh, or partially perforated mesh.

In accordance with again an additional feature of the invention, when the removable motherboard unit is configured to be inserted into a rear opening, top and side panels are attached to the frame.

In accordance with still another feature of the invention, the top and side panels are at least one of transparent, partially transparent, opaque, partially opaque, perforated mesh, or partially perforated mesh.

In accordance with still a further feature of the invention, the computer housing includes an expansion area.

In accordance with still an added feature of the invention, the expansion area includes at least one cooling apparatus.

In accordance with a concomitant feature of the invention, a liquid cooling apparatus is included in a top portion of the computer housing.

Although the invention is illustrated and described herein as embodied in a computer housing, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which:

FIG. 15 is a partial perspective cutaway view of the computer assembly of FIG. 12 with a motherboard unit inserted in the second configuration, in accordance with one embodiment.

DETAILED DESCRIPTION OF THE INVENTION

Figure 1:
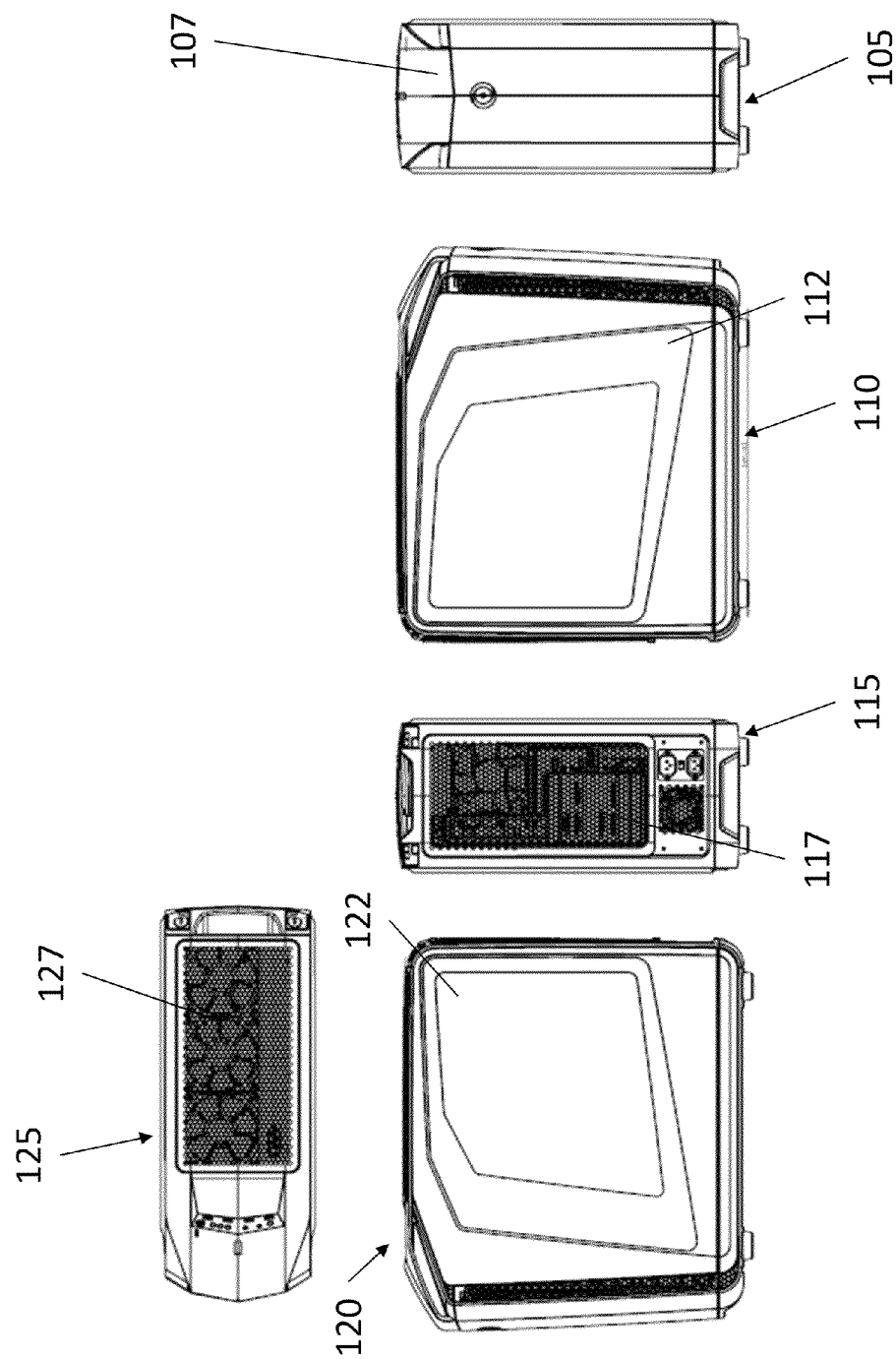
FIG. 1 is a front, top, side, and rear view of a computer housing, in accordance with one embodiment.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

The terms "program," "software," "software application," and the like as used herein, are defined as a sequence of instructions designed for execution on a computer system. A "program," "software," "application," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

The computer housing comprises a frame and a plurality of openings on the frame configured to receive a removable motherboard unit. The removable motherboard unit comprises at least a tray and a motherboard with video cards attached to the tray. The tray is a cut-out that can be easily inserted and removed from the computer housing.

The plurality of openings on the frame of the computer housing can be configured to receive the removable motherboard unit from a top opening or a rear opening. The removable motherboard unit can be inserted into the opening, e.g., either from the top or from the rear, and placed into the housing in a first configuration.

The removable motherboard unit can also be rotated, e.g., 180 degrees, and placed into the housing in the respective opening in a second configuration. Thus, the removable motherboard unit can be inserted into the housing in at least four different configurations.

Various side, top, and rear panels can be used depending on the particular configuration desired. Side, top, and rear panels can be transparent, opaque, a perforated mesh, or some combination thereof. Side, top, and rear panels can also be partially transparent, partially opaque, partially perforated mesh, or some combination thereof.

Described now are exemplary embodiments of the present invention. Referring now to the figures of the drawings in detail and first, particularly to FIG. 1, there is shown a first exemplary embodiment of a computer housing.

FIG. 1 illustrates multiple views 105, 110, 115, 120, 125 of a computer housing according to one embodiment. Front view 105 may have a power button 107. Side views 110, 120 show an opaque side panel 112, 122. Rear view 115 shows a mesh rear panel 117. Top view 125 shows a mesh top panel 127.

Figure 2:
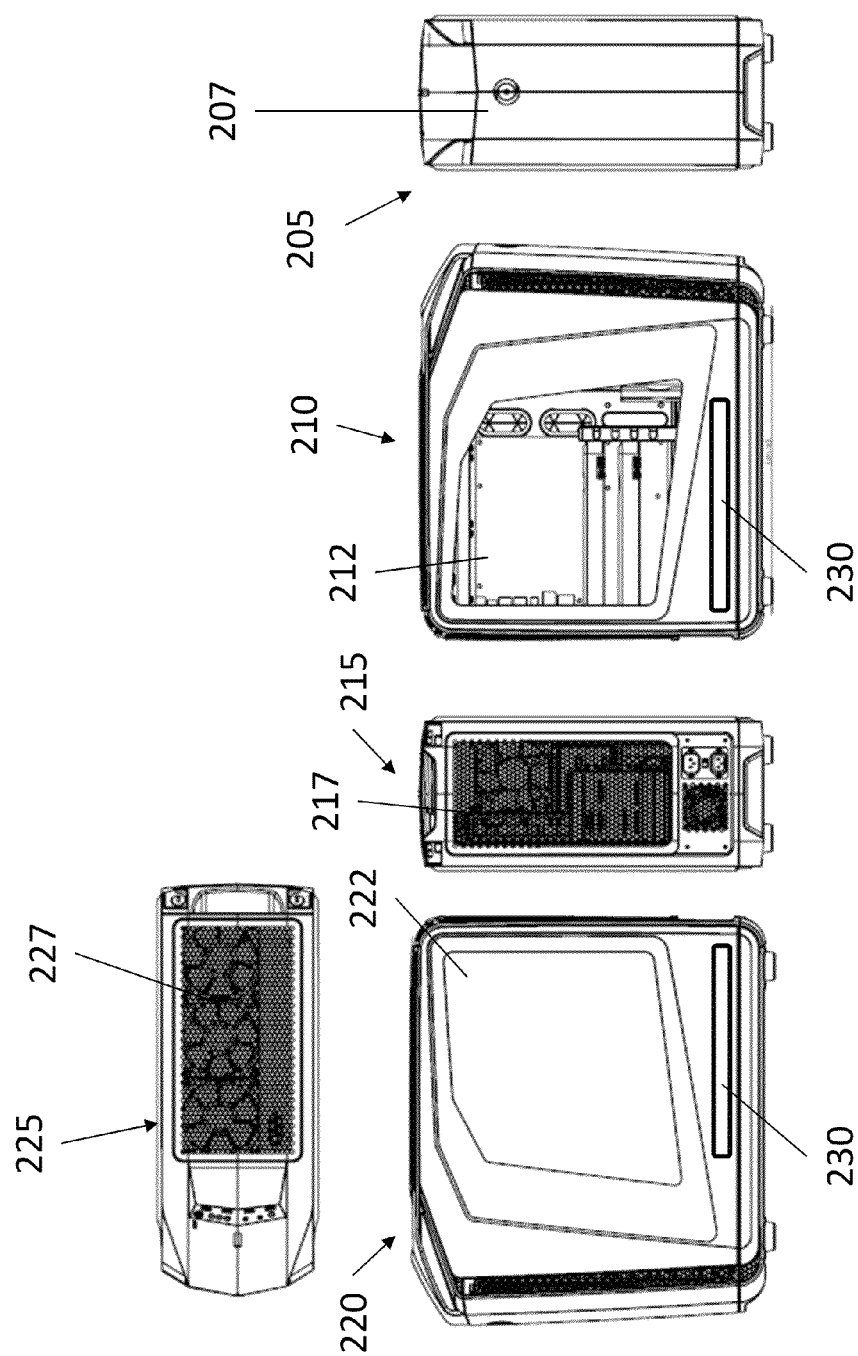
FIG. 2 is a front, top, side, and rear view of a computer housing with an expansion area, in accordance with one embodiment.

FIG. 2 illustrates multiple views 205, 210, 215, 220, 225 of a computer housing according to one embodiment. The computer housing of FIG. 2 differs from the computer housing of FIG. 1 in that the computer housing of FIG. 2 also includes an expansion area 230 that is used to accommodate further components. Front view 205 may have a power button 207. Side view 210 includes a partially transparent side panel 212. Side view 220 shows an opaque side panel 222. Rear view 215 shows a mesh rear panel 217. Top view 225 shows a perforated mesh top panel 227.

Figure 3:
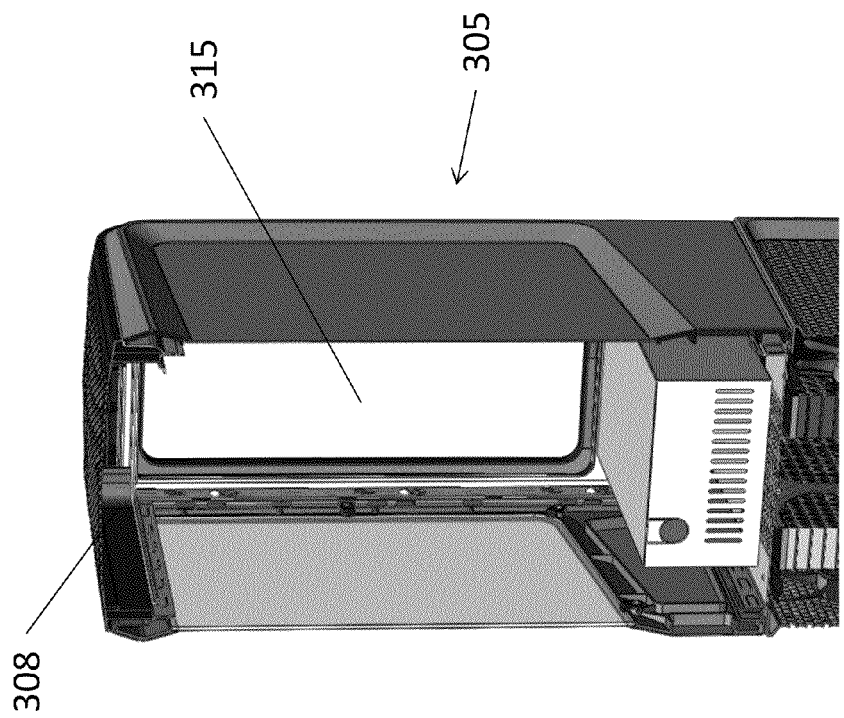
FIG. 3 is a perspective cutaway view of an empty computer housing, in accordance with one embodiment.

FIG. 3 illustrates a perspective cutaway view of an empty computer housing 305. The motherboard (and related components) can be inserted in four configurations. From a top portion 308 of housing 305, a motherboard can be inserted in two configurations. From a rear portion 315 of housing 305, the motherboard can also be inserted in two other configurations.

Figure 4:
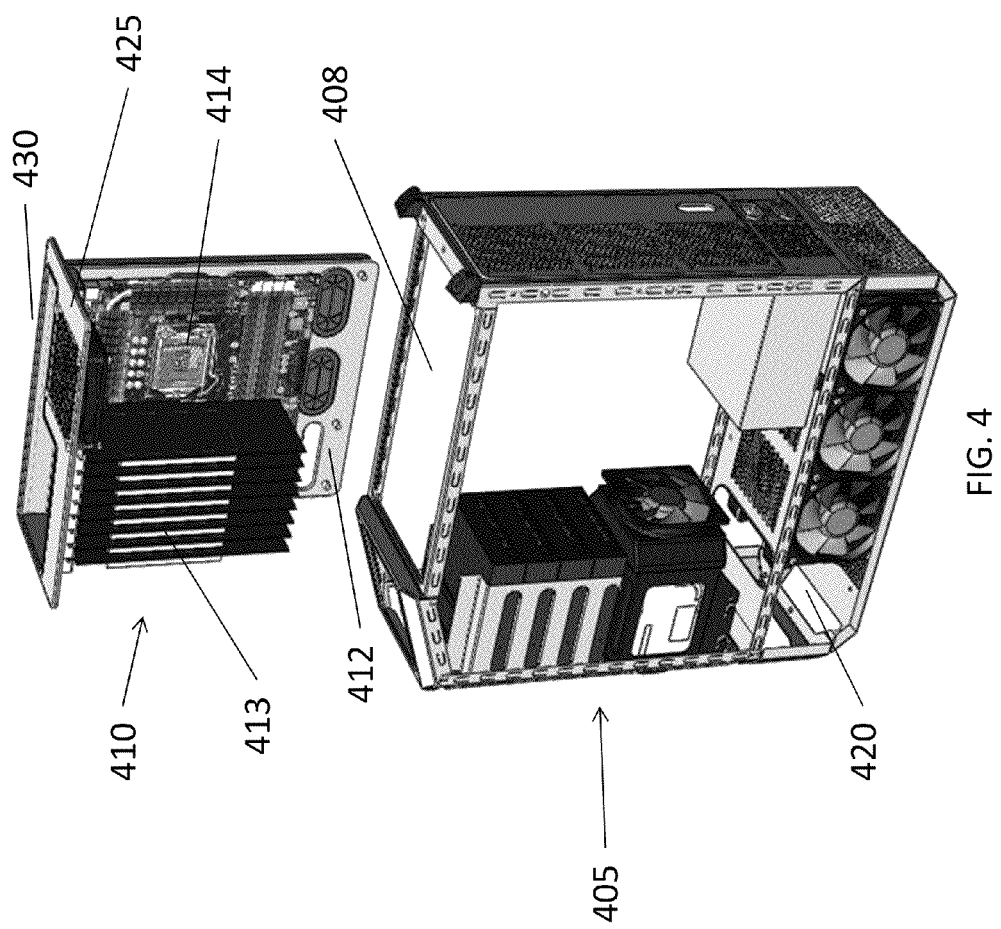
FIG. 4 is an exploded perspective view of a computer housing with a motherboard unit that can be inserted vertically in a first configuration from a top portion of the computer housing, in accordance with one embodiment.

FIG. 4 illustrates an exploded perspective view of a configurable computer assembly in a first vertical insertion configuration with top and side panels of the housing 405 removed. Computer housing 405 is able to vertically receive a motherboard unit 410. The motherboard unit 410 is inserted vertically from a top portion 408 of computer housing 405. Motherboard unit 410 comprises a board tray 412, a motherboard 414, and a panel 425. Panel 425 allows access to external input/output ports of the motherboard and/or video cards 413. Motherboard unit 410 is inserted from the top of computer housing 405. In this configuration, the video cards 413 of motherboard 414 are aligned vertically when installed through the top portion 408 of computer housing 405. A bottom brace (not shown) can be used to further secure the mother board unit 410 within computer housing 405. Although expansion area 420 is shown with cooling fans, this configuration is optional. Typically, an opaque side panel can be installed on the side behind the motherboard unit and an at least partially transparent side panel, similar to side panel 212 can be installed on the side facing the motherboard unit. The top and rear panels in this configuration can be either an opaque panel or a mesh panel.

Figure 5:
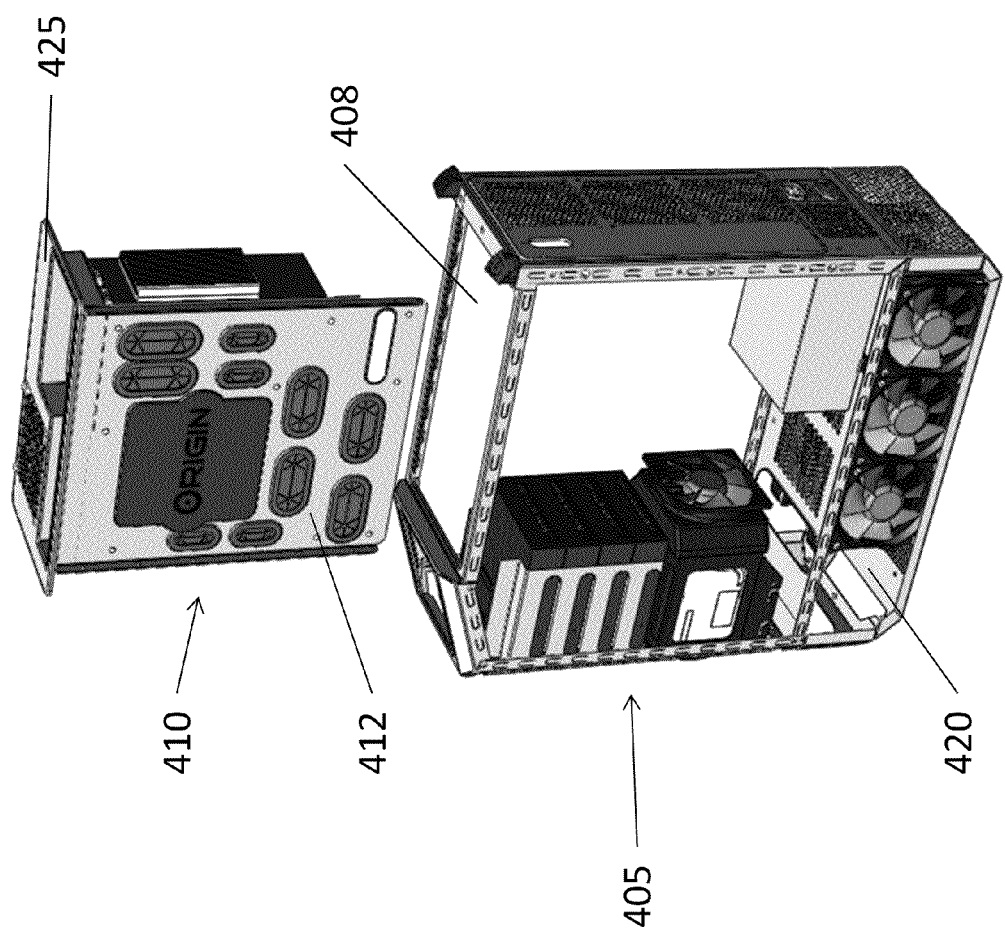
FIG. 5 is an exploded perspective view of a computer housing with a motherboard unit that can be inserted vertically in a second configuration from a top portion of the computer housing on an opposite side with respect to the configuration shown in FIG. 4, in accordance with one embodiment.

FIG. 5 illustrates an exploded perspective view of a configurable computer assembly in a second vertical insertion configuration with top and side panels of the housing 405 removed. Computer housing 405 is able to vertically receive a motherboard unit 410 in a second configuration. This is accomplished by rotating the motherboard unit 180 degrees about a vertical axis and vertically inserting the motherboard unit 410 into a top portion 408 of computer housing 405. Motherboard unit 410 comprises a board tray 412, a motherboard (not shown), and a panel 425. Panel 425 allows access to external input/output ports of the motherboard and/or video cards 413. Motherboard unit 410 is inserted from the top of computer housing 405. In this configuration, the video cards 413 of motherboard 414 are aligned vertically when installed through the top portion 408 of computer housing 405. A bottom brace (not shown) can be used to further secure the mother board unit 410 within computer housing 405. Although expansion area 420 is shown with cooling fans, this configuration is optional. Typically, an opaque side panel can be installed on the side behind the motherboard unit and an at least partially transparent side panel, similar to side panel 212 can be installed on the side facing the motherboard unit. The top and rear panels in this configuration can be either an opaque panel or a mesh panel.

When the motherboard unit 410 is configured for top facing ports, guide rails that are used for rear facing port configurations are removed in order to facilitate easy drop down of the motherboard unit 410. A liquid cooling assembly normally used in the rear facing port configuration can also be eliminated for the top facing port configurations if there are space limitations.

Fastening element 430 is used to fasten the board tray 412 to the top panel of the housing 405. Fastening techniques can be configured in a variety of ways, e.g., using clips, screws, tabs, etc.

Figure 6:
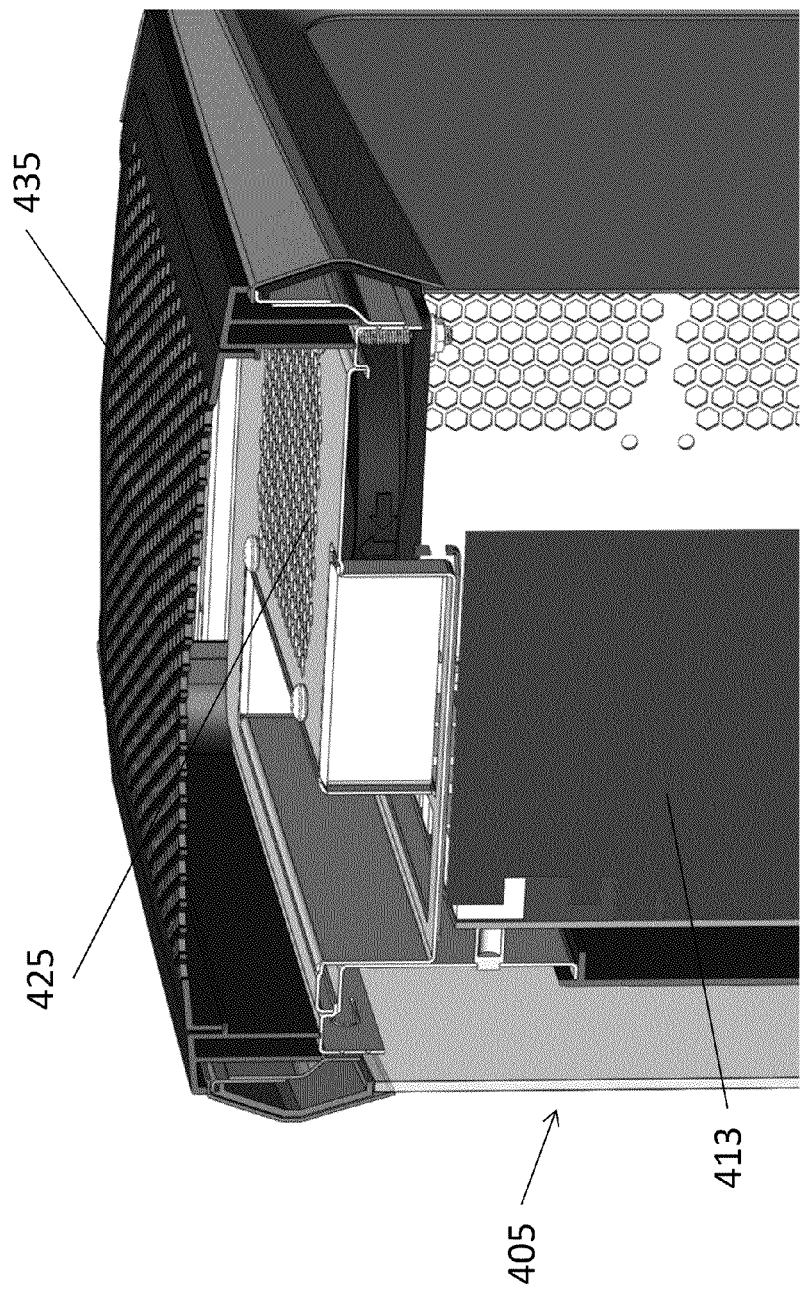
FIG. 6 is a partial perspective cutaway view of the computer assembly of FIG. 4 with a motherboard unit inserted in the first configuration, in accordance with one embodiment.

FIG. 6 is a partial perspective cutaway view of computer housing 405 with the motherboard unit inserted. This view shows a back portion of one of the video cards 413 and panel 425. In addition, top panel 435 of housing 405 is also shown. In this embodiment, top panel 435 is a mesh panel.

Figure 7:
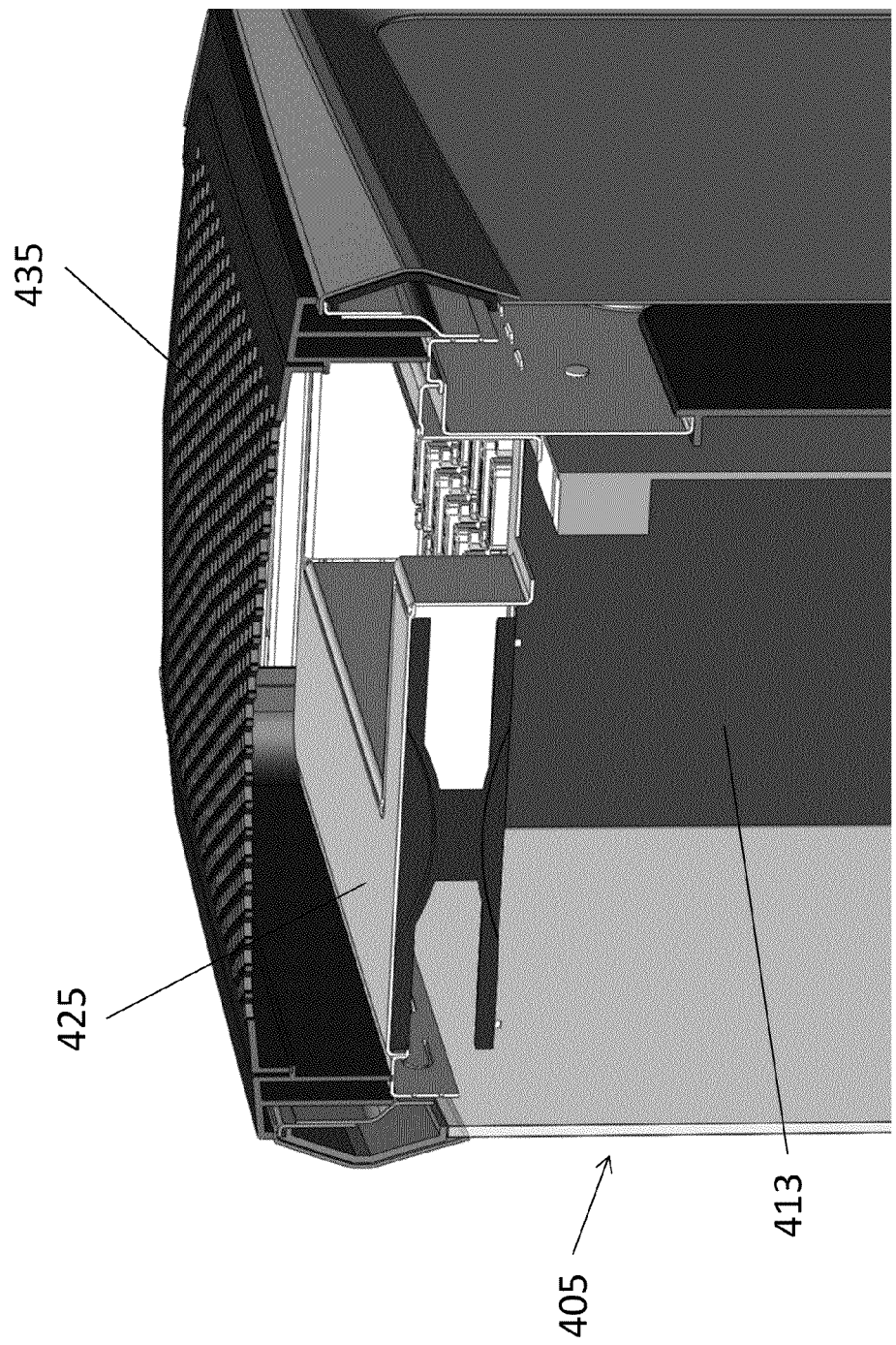
FIG. 7 is a partial perspective cutaway view of the computer assembly of FIG. 5 with a motherboard unit inserted in the second configuration, in accordance with one embodiment.

FIG. 7 is a partial perspective cutaway view of computer housing 405 with the motherboard unit inserted. This view shows a front portion of one of the video cards 413 and panel 425. In addition, top panel 435 of housing 405 is also shown. In this embodiment, top panel 435 is a mesh panel.

Figure 8:
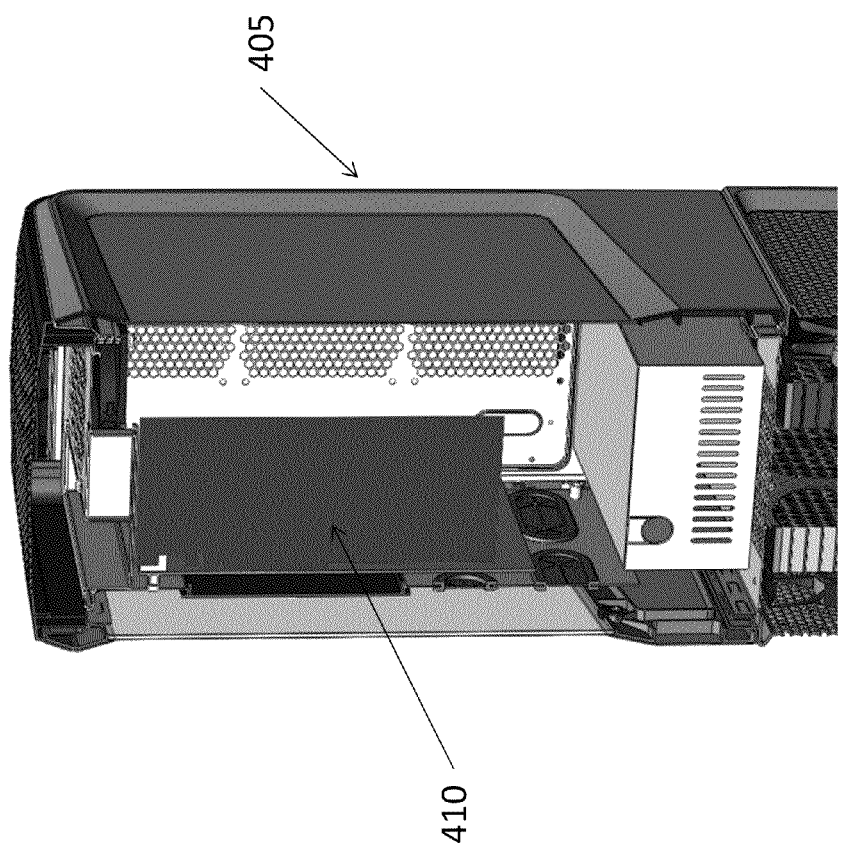
FIG. 8 is a partial perspective cutaway view of the computer assembly of FIG. 4 with a motherboard unit inserted in the first configuration.
Figure 9:
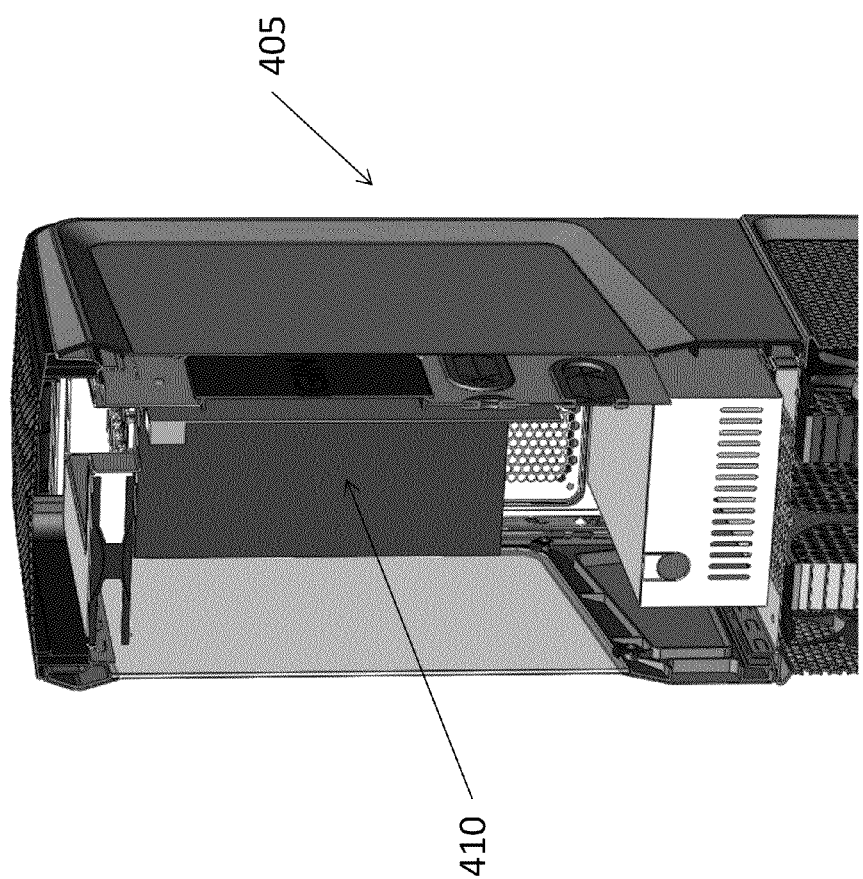
FIG. 9 is a partial perspective cutaway view of the computer assembly of FIG. 5 with a motherboard unit inserted in the second configuration.

FIG. 8 illustrates a partial, perspective, cutaway view of a computer housing 405 with a motherboard unit 410 inserted in a first vertical configuration. FIG. 9 illustrates a partial, perspective, cutaway view of a computer housing 405 with a motherboard unit 410 inserted in a second vertical configuration.

Figure 10:
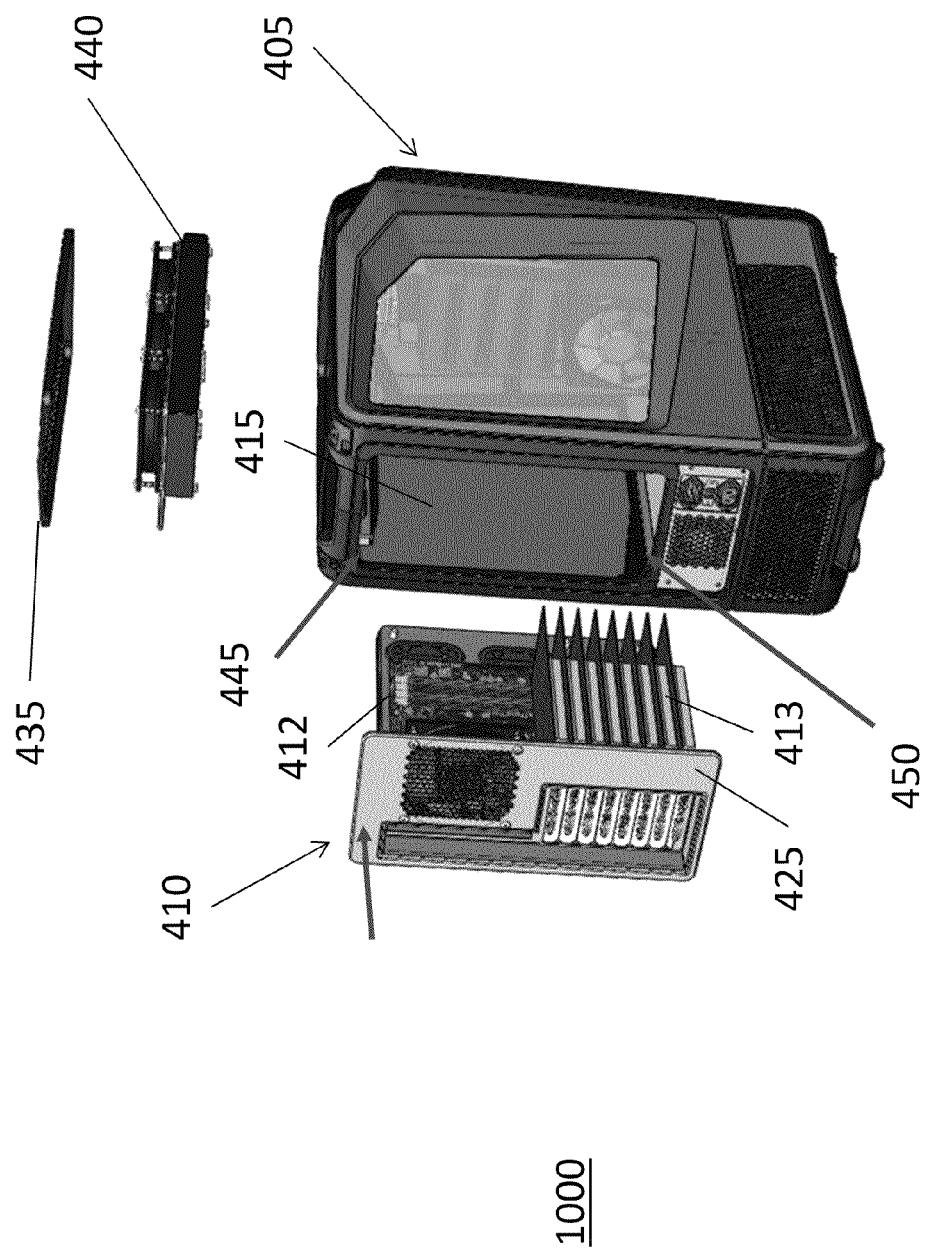
FIG. 10 is an exploded perspective view of a computer housing with a motherboard unit that can be inserted horizontally in a first configuration from a rear portion of the computer housing, in accordance with one embodiment.

FIG. 10 illustrates an exploded perspective view of a computer housing assembly 1000 in a first rear horizontal insertion configuration. Motherboard unit 410 is inserted into a rear portion 415 of computer housing 405. The motherboard unit 410 is inserted/removed by sliding the board tray 412 along a pair of rail guides, e.g., upper rail 445 and lower rail 450. In this configuration, the video cards 413 of motherboard 414 are aligned horizontally when installed through the rear of computer housing 405. Typically, an opaque side panel can be installed on the side behind the motherboard unit and an at least partially transparent side panel, similar to side panel 212 can be installed on the side facing the motherboard unit. The top and rear panels in this configuration can be either an opaque panel or a mesh panel. Panel 425 allows access to external input/output ports of the motherboard and/or video cards 413.

Figure 11:
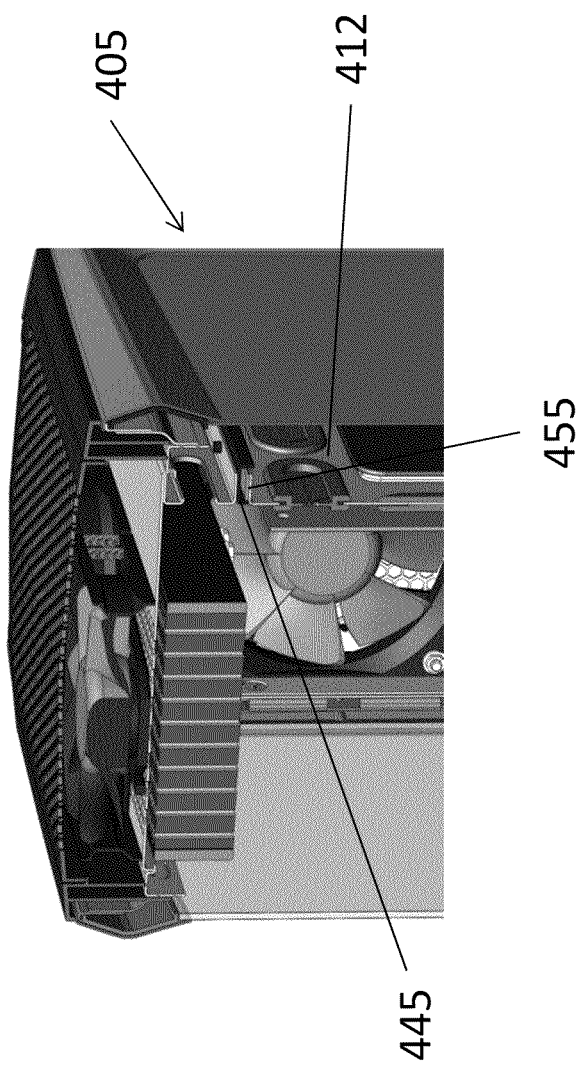
FIG. 11 is a partial perspective cutaway view of the computer assembly of FIG. 10 with a motherboard unit inserted in a first configuration, in accordance with one embodiment.

FIG. 11 illustrates a perspective cutaway view of housing 405 with motherboard unit 410 installed in the first rear insertion configuration. In this view, a portion of board tray 412 forms a tab 455 that is used to slide the motherboard unit along the upper rail 445.

Figure 12:
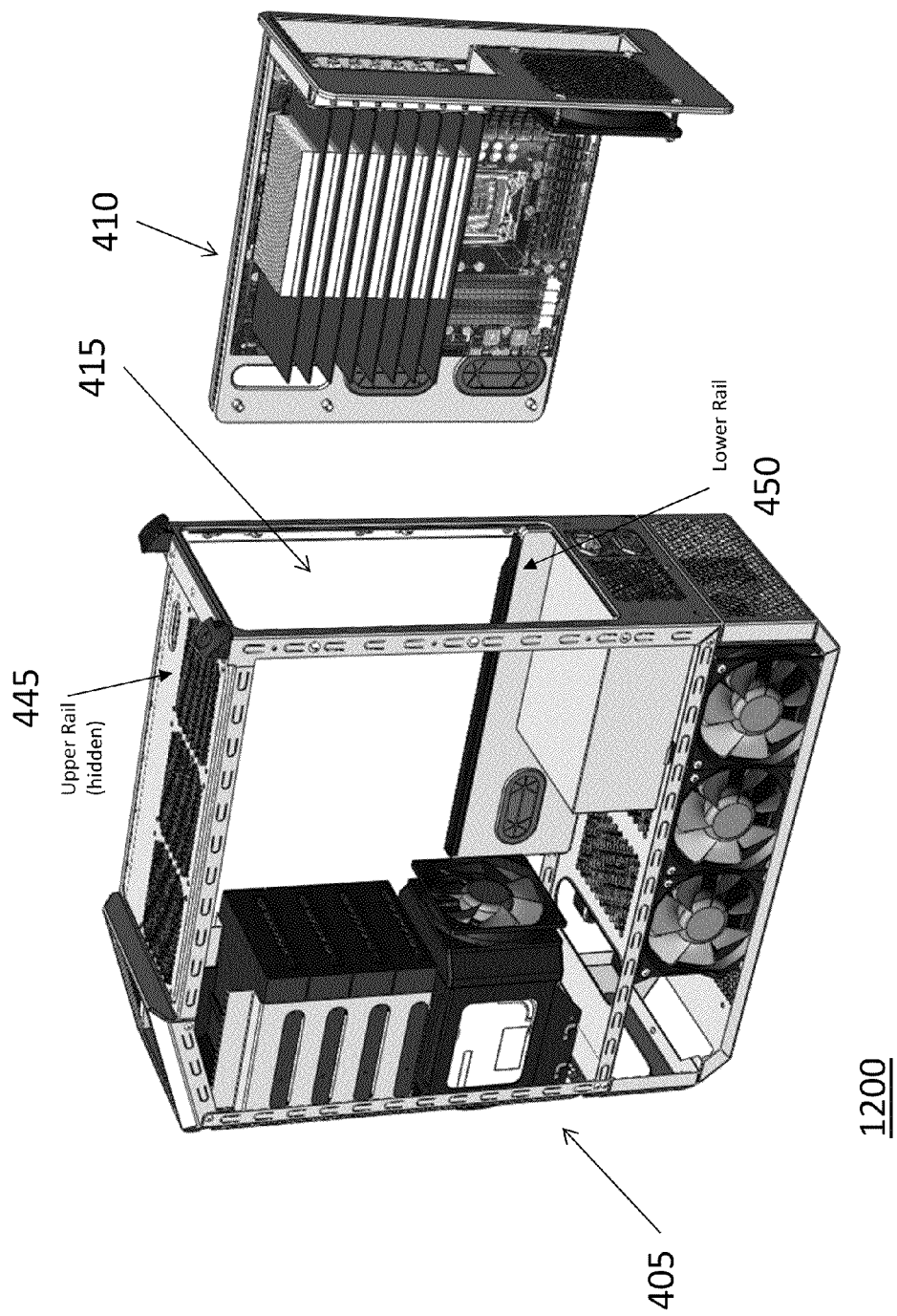
FIG. 12 is an exploded perspective view of a computer housing with a motherboard unit that can be inserted horizontally in a second configuration from a rear portion of the computer housing on an opposite side with respect to the configuration shown in FIG. 10, in accordance with one embodiment.

FIG. 12 illustrates an exploded perspective view of a configurable computer assembly 1200 in a second rear horizontal insertion configuration with top and side panels of the housing 405 removed. Computer housing 405 is able to horizontally receive a motherboard unit 410 in a second configuration. This is accomplished by rotating the motherboard unit 180 degrees about a horizontal axis and horizontally inserting the motherboard unit 410 into a rear portion 415 of computer housing 405. In this view, upper rail 445 (not shown) and lower rail 450 are used when motherboard unit 410 is inserted into computer housing 405.

Figure 13:
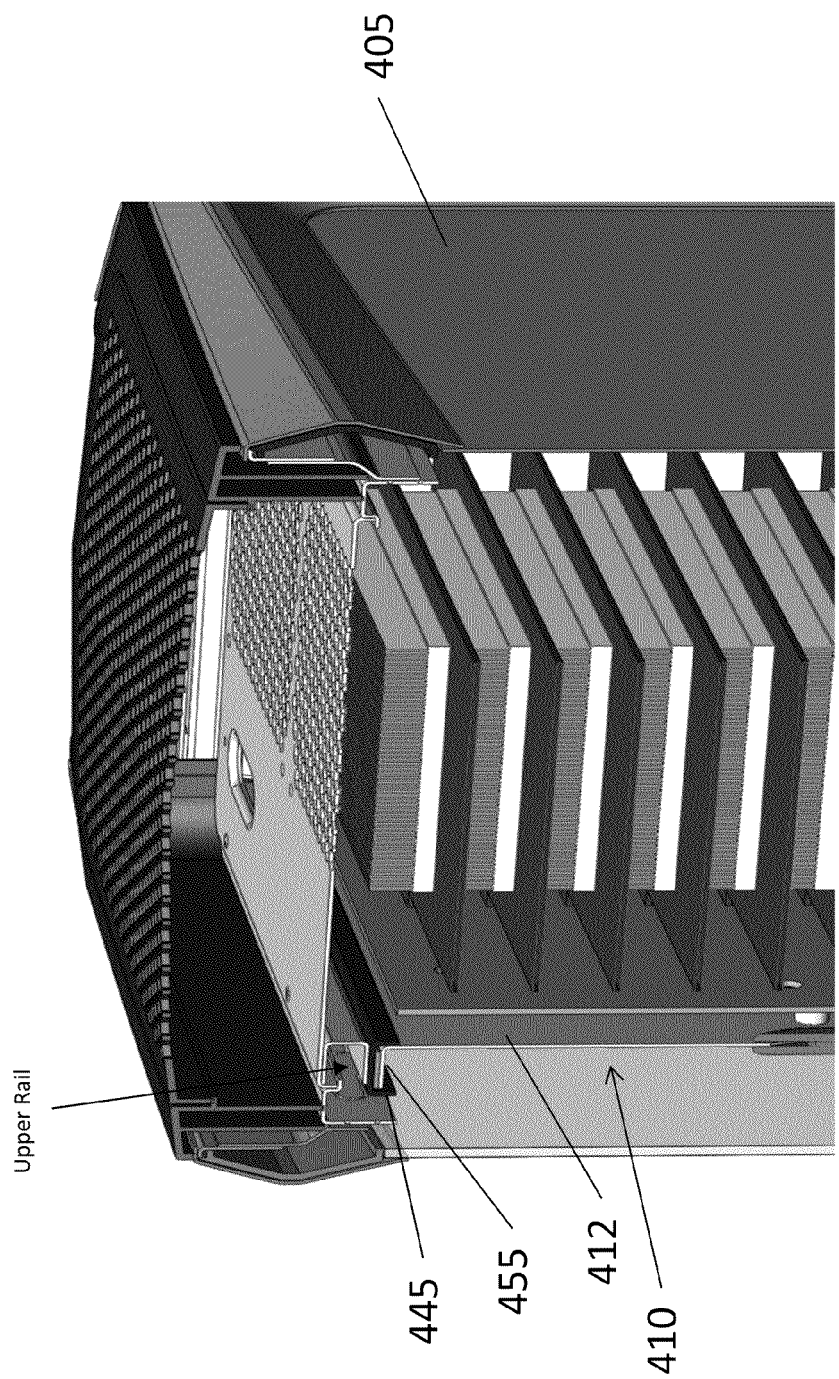
FIG. 13 is a partial perspective cutaway view of the computer assembly of FIG. 12 with a motherboard unit inserted in the second configuration, in accordance with one embodiment.

FIG. 13 illustrates a partial, perspective, cutaway view of housing 405 with motherboard unit 410 installed in the second rear horizontal insertion configuration. In this view, a portion of board tray 412 forms a tab 455 that is used to slide the motherboard unit along the upper rail 445.

A liquid cooling assembly 440 (as shown in FIG. 10) can be used in either rear facing port configuration. This liquid cooling assembly can be inserted into a top portion of computer housing 405. A top cover 435 can be placed on a top portion of housing 405. This top cover 435 can be a mesh cover.

Fastening element 430 is used to fasten the board tray 412 to the rear panel of the housing 405. Fastening techniques can be configured in a variety of ways, e.g., using clips, screws, tabs, etc.

In the rear horizontal insertion configurations, the video cards 413 of motherboard 414 are aligned horizontally when installed through the rear of computer housing 405. Typically, an opaque side panel can be installed on the side behind the motherboard unit and an at least partially transparent side panel, similar to side panel 212 can be installed on the side facing the motherboard unit. The top and rear panels in this configuration are typically either an opaque panel or a mesh panel.

Figure 14:
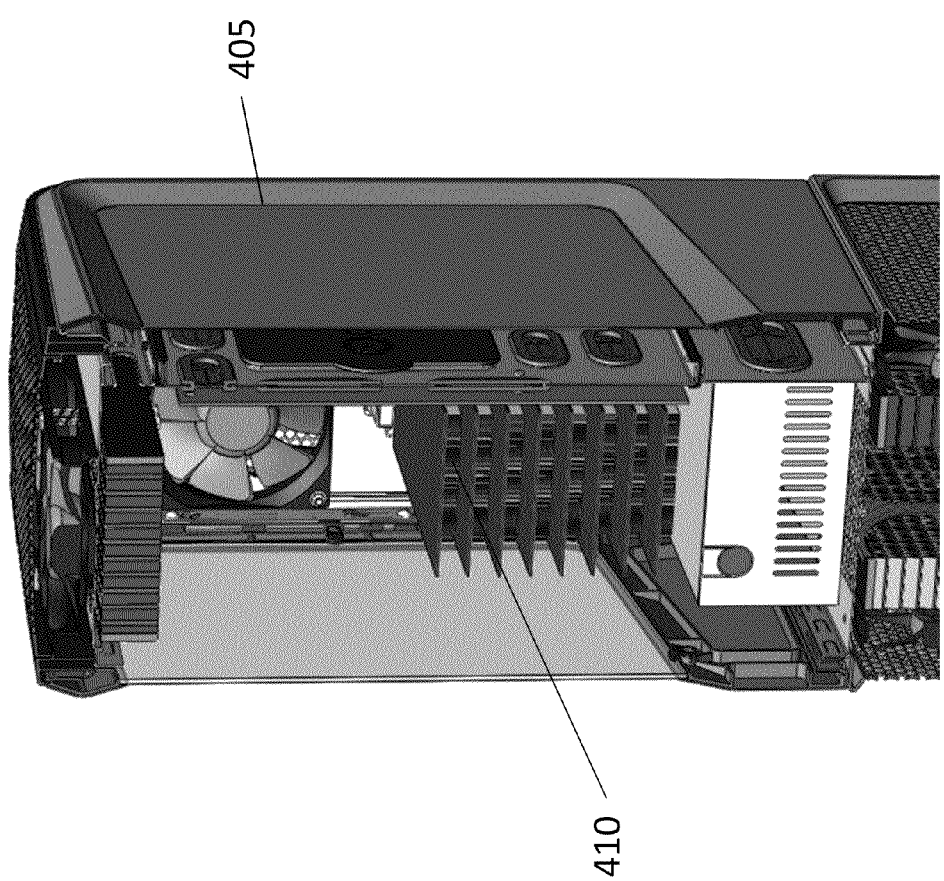
FIG. 14 is a partial perspective cutaway view of the computer assembly of FIG. 10 with a motherboard unit inserted in the first configuration, in accordance with one embodiment.

FIG. 14 illustrates a partial, perspective, cutaway view of a computer housing 405 with a motherboard unit inserted in a first horizontal configuration. FIG. 15 illustrates a partial, perspective, cutaway view of a computer housing 405 with a motherboard unit 410 inserted in a second horizontal configuration.

Although typical panel selections are disclosed with respect to all of the previously described figures, e.g. FIGS. 1-15, it should be readily apparent that side, top, and rear panel selections are dependent on the particular configuration desired by a user of the computer housing.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A configurable computer housing, comprising:
   a frame;
   a removable motherboard unit; and
   at least two distinct openings on the frame, each of the openings configured to receive the removable motherboard unit.

2. The computer housing of claim 1, wherein the removable motherboard unit comprises a tray and a motherboard attached to the tray.

3. The computer housing of claim 2, wherein the motherboard includes at least one video card.

4. The computer housing of claim 1, wherein the removable motherboard unit is configured to be inserted into a top opening of the at least two distinct openings on the frame in a first position.

5. The computer housing of claim 4, wherein the removable motherboard unit is configured to be inserted into the top opening of the at least two distinct openings on the frame in a second position.

6. The computer housing of claim 5, wherein the removable motherboard unit is rotated in order to be placed in the second position.

7. The computer housing of claim 1, wherein the removable motherboard unit is configured to be inserted into a rear opening of the at least two distinct openings on the frame in a first position.

8. The computer housing of claim 7, wherein the removable motherboard unit is configured to be inserted into the rear opening of the at least two distinct openings on the frame in a second position.

9. The computer housing of claim 8, wherein the removable motherboard unit is rotated in order to be placed in the second position.

10. The computer housing of claim 1, wherein at least one side opening is configured to receive a transparent side panel.

11. The computer housing of claim 1, wherein when the removable motherboard unit is configured to be inserted into a top opening, rear and side panels are attached to the frame.

12. The computer housing of claim 11, wherein the rear and side panels are at least one of transparent, partially transparent, opaque, partially opaque, perforated mesh, or partially perforated mesh.

13. The computer housing of claim 1, wherein when the removable motherboard unit is configured to be inserted into a rear opening, top and side panels are attached to the frame.

14. The computer housing of claim 13, wherein the top and side panels are at least one of transparent, partially transparent, opaque, partially opaque, perforated mesh, or partially perforated mesh.

15. The computer housing of claim 1, wherein the computer housing includes an expansion area.

16. The computer housing of claim 15, wherein the expansion area includes at least one cooling apparatus.

17. The computer housing of claim 1, wherein a liquid cooling apparatus is included in a top portion of the computer housing.

18. A configurable computer housing, comprising:
a frame having six sides;
a removable motherboard unit; and
openings on at least two sides of the frame, each of the plurality of openings configured to receive the removable motherboard unit.

19. The configurable computer housing of claim 18, wherein:
the six sides include a top, a bottom, left and right sides, a back, and a front; and
the openings are on the top and the back.

\* \* \* \* \*